(12) United States Patent
Panday et al.

(10) Patent No.: US 11,813,919 B2
(45) Date of Patent: Nov. 14, 2023

(54) BREAK-AWAY ADAPTER BRACKET

(71) Applicants: Kedar V Panday, Troy, MI (US); Krishnamurthy N Hegd, Rochester Hills, MI (US); Maximilian P Larraquette, Rochester Hills, MI (US); Anthony A Stajanovski, Chesterfield, MI (US); Richard C Chiarcos, Rochester, MI (US); Alexander Kurz, Brighton, MI (US)

(72) Inventors: Kedar V Panday, Troy, MI (US); Krishnamurthy N Hegd, Rochester Hills, MI (US); Maximilian P Larraquette, Rochester Hills, MI (US); Anthony A Stajanovski, Chesterfield, MI (US); Richard C Chiarcos, Rochester, MI (US); Alexander Kurz, Brighton, MI (US)

(73) Assignee: FCA US LLC, Auburn Hills, MI (US)

( * ) Notice: Subject to any disclaimer, the term of this patent is extended or adjusted under 35 U.S.C. 154(b) by 407 days.

(21) Appl. No.: 17/223,416

(22) Filed: Apr. 6, 2021

(65) Prior Publication Data
US 2022/0314739 A1  Oct. 6, 2022

(51) Int. Cl.
*A47F 1/00* (2006.01)
*B60H 1/00* (2006.01)
*B60H 1/32* (2006.01)

(52) U.S. Cl.
CPC ..... *B60H 1/00521* (2013.01); *B60H 1/00392* (2013.01); *B60H 1/3229* (2013.01)

(58) Field of Classification Search
CPC ............ B60H 1/00521; B60H 1/00392; B60H 1/3229
See application file for complete search history.

(56) References Cited

U.S. PATENT DOCUMENTS 6,053,463 A * 4/2000 Melvin .................... E01F 9/635
248/909
6,398,259 B1 * 6/2002 Palmer ................... B62D 1/195
188/371
7,740,210 B2 * 6/2010 Pilon ...................... F16L 3/2336
248/909

(Continued)

FOREIGN PATENT DOCUMENTS

CN    108437740 A    8/2018
JP    5757283 B2    7/2015
KR    200151625 Y1    7/1999

*Primary Examiner* — Amy J. Sterling
(74) *Attorney, Agent, or Firm* — Jeremy J. Klobucar

(57) ABSTRACT

A bracket configured to mount a high voltage component to a structure of a vehicle. The bracket includes a body, a plurality of first apertures formed in the body that are each respectively configured for receipt of a fastener that secures the body to the high voltage component, and a plurality of second apertures formed in the body that are respectively configured for receipt of a fastener that secures the body to the structure of the vehicle. Upon application of a sufficient force to the vehicle, a material of the body that forms at least one of the first apertures and the second apertures is configured to fail to permit either the body and the high voltage component to disengage from structure of the vehicle or the high voltage component to disengage from the body.

20 Claims, 3 Drawing Sheets

(56) References Cited

U.S. PATENT DOCUMENTS

| | | | |
|---|---|---|---|
| 11,254,274 B1* | 2/2022 | Allbee | B62D 21/11 |
| 11,691,517 B1* | 7/2023 | Lohe | H02J 7/0032 |
| | | | 244/53 R |
| 2008/0241667 A1* | 10/2008 | Kohn | B60L 3/04 |
| | | | 429/159 |
| 2009/0139781 A1* | 6/2009 | Straubel | B60L 53/14 |
| | | | 701/22 |
| 2020/0400146 A1* | 12/2020 | Rademacher | F04D 29/624 |
| 2021/0403090 A1* | 12/2021 | Shah | B60R 19/24 |
| 2023/0163390 A1* | 5/2023 | Wassmur | H01M 50/242 |
| | | | 180/271 |

\* cited by examiner

BREAK-AWAY ADAPTER BRACKET

FIELD

The present disclosure relates to a break-away adapter bracket.

BACKGROUND

In recent years, electric vehicles and hybrid vehicles have become more widespread. These vehicles are increasingly using a high number of high voltage components including, for example, a high voltage electric air conditioning compressor (EAC). Inasmuch as these components utilize a high voltage, it is important to try to protect these components from damage in the event of a vehicle impact. This is because these components are typically expensive, and because protecting these components can have a good and robust effect on high voltage battery shutdown and high voltage isolation.

In the past, attempts have been made to protect these components by using different materials for the component's housing. Example materials include those that have a greater yield and percentage elongation to try to better absorb energy in the event of a vehicle impact. Incorporating a change in material to the housing, however, may not be compatible with tooling, and can result in delayed manufacturing time.

Other ways to protect the high voltage component may include adding a physical blocking member or device around the component, or repackaging the component to a location that is more protected. Use of a physical blocking member, or repackaging the component to a location that is more protected can be very costly from a design standpoint, and such blocking or repackaging may not be feasible in some situations.

SUMMARY

According to a first aspect of the present disclosure, there is provided a bracket configured to mount a high voltage component to a structure of a vehicle. The bracket includes a body including a first major surface that faces the high voltage component and an opposing second major surface that faces the structure of the vehicle. A plurality of first apertures formed in the body that are each respectively configured for receipt of a fastener that secures the body to the high voltage component, and a plurality of second apertures formed in the body that are respectively configured for receipt of a fastener that secures the body to the structure of the vehicle. Upon application of a sufficient force to the vehicle, a material of the body that forms at least one of the first apertures and the second apertures is configured to fail to permit either the body and the high voltage component to disengage from structure of the vehicle or the high voltage component to disengage from the body.

According to the first aspect, the body is triangular and includes a central opening, and each of the first and second apertures are formed at corners of the triangular body, the first apertures being located nearer to the central opening in comparison to the second apertures.

According to the first aspect, the triangular body includes a first end and an opposing second end, a pair of first side surfaces that connect the first end to the opposing second end, and a second side surface that extends along the second end, the first major surface includes two pairs of first elongated ribs that extend along the triangular body from the first end to the second end in parallel with the pair of first side surfaces, and a pair of second elongated ribs extend along the triangular body at the second end in parallel with second side surface.

According to the first aspect, the first and second elongated ribs increase the structural integrity of the triangular body.

According to the first aspect, the first major surface includes a contoured surface that corresponds to an outer surface of the high voltage component.

According to the first aspect, the second major surface includes a plurality of third elongated ribs that extend between first end to second end and orthogonal to a side surface that extends along the second end of the triangular body.

According to the first aspect, each of first and second major surfaces are tiered such that the first and second major surfaces each include a first tier at the first end and a second tier at the second end that are connected by an inclined section.

According to the first aspect, the body is formed of a polymeric material or a metal material.

According to the first aspect, the polymeric material includes a polyamide material.

According to the first aspect, the polymeric material includes aluminum.

According to a second aspect of the present disclosure, there is provided a vehicle that includes a propulsion system, a high voltage electric air conditioning compressor (EAC) including a housing coupled to the propulsion system, and a bracket that detachably couples the housing of the EAC to the propulsion system. The bracket includes a body including a first major surface that faces the EAC and an opposing second major surface that faces the propulsion system, a plurality of first apertures formed in the body that are each respectively configured for receipt of a fastener that secures the body to the housing of the EAC, and a plurality of second apertures formed in the body that are respectively configured for receipt of a fastener that secures the body to the propulsion system. Upon application of a sufficient force to the vehicle, a material of the body that forms at least one of the first apertures and the second apertures is configured to fail to permit either the body and the EAC to disengage from propulsion system of the vehicle or the EAC to disengage from the body.

According to the second aspect, the body is triangular and includes a central opening, and each of the first and second apertures are formed at corners of the triangular body, the first apertures being located nearer to the central opening in comparison to the second apertures.

According to the second aspect, the triangular body includes a first end and an opposing second end, a pair of first side surfaces that connect the first end to the opposing second end, and a second side surface that extends along the second end, the first major surface includes two pairs of first elongated ribs that extend along the triangular body from the first end to the second end in parallel with the pair of first side surfaces, and a pair of second elongated ribs extend along the triangular body at the second end in parallel with second side surface.

According to the second aspect, the first and second elongated ribs increase the structural integrity of the triangular body.

According to the second aspect, the first major surface includes a contoured surface that corresponds to an outer surface of the housing of the EAC.

According to the second aspect, the second major surface includes a plurality of third elongated ribs that extend between first end to second end and orthogonal to a side surface that extends along the second end of the triangular body.

According to the second aspect, each of first and second major surfaces are tiered such that the first and second major surfaces each include a first tier at the first end and a second tier at the second end that are connected by an inclined section.

According to the second aspect, the body is formed of a polymeric material or a metal material.

According to the second aspect, the polymeric material includes a polyamide material.

According to the second aspect, the metal material includes aluminum.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
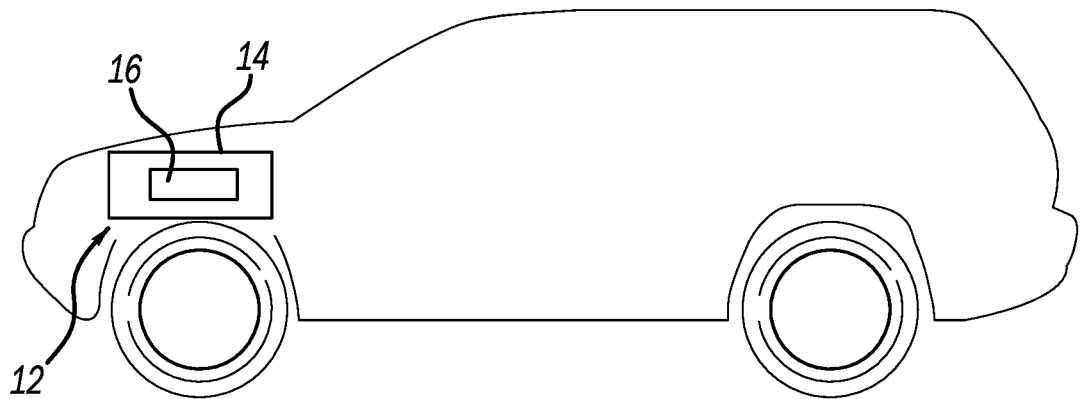
FIG. 1 is a schematic representation of a vehicle including an electrical component mounted to an engine of the vehicle.

FIG. 1 illustrates a vehicle 10 including an engine compartment 12 that contains an engine 14. Engine 14 may be an internal combustion engine, a hybrid propulsion engine, or an electric motor. A high voltage component 16 is mounted to the engine 14 within the engine compartment 12. High voltage component 16 may be, for example, a high voltage electric air conditioning compressor (EAC). Other high voltage components such as an inverter or some other type of high voltage component are contemplated. High voltage component 16 is mounted to engine 14 with a breakaway adapter bracket 18 (FIG. 2).

Figure 2:
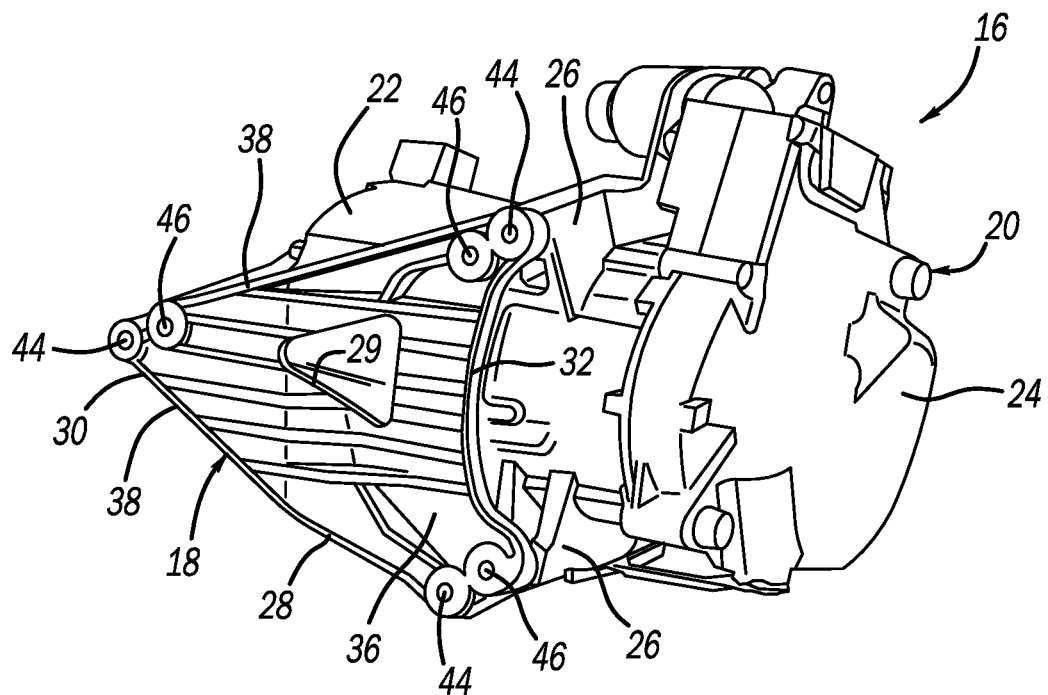
FIG. 2 is a perspective view of an electrical component mounted to a breakaway adapter bracket according to a principle of the present disclosure.

Now referring to FIGS. 2-6, and as best shown in FIG. 2, high voltage component 16 includes a housing 20 that contains a compressor (not shown). Housing 20 may include a cylindrical body 22 that houses an electric motor (not shown) of the compressor (not shown), and a cap 24 that houses the compressor (not shown). In the illustrated embodiment, cylindrical body 22 includes a plurality of mounting portions 26 configured for receipt of a fastener (not shown) that may be used to secure high voltage component 16 to breakaway adapter bracket 18.

In the illustrated embodiment, bracket 18 may be a triangular shaped body 28 having a first end 30, an opposite second end 32, a first surface 34 that is configured to face the housing 20 of the high voltage component 16, and an opposite second surface 36 that is configured to face engine 14. First surface 34 is connected to the second surface 36 by three side surfaces. A first pair of side surfaces 38 extend from first end 30 to second end 32. A second side surface 40 extends along second end 32. Although not required, triangular shaped body 28 may have an opening 29 formed at an interior thereof, which reduces the mass of the triangular shaped body 28.

Bracket 18 is configured to be fixed to housing 20 of the high voltage component 16, and is configured to be fixed to engine 14. To connect bracket 18 to housing 20, bracket 18 includes a plurality of first apertures 44 configured for receipt of a fastener (not shown) that are formed at the corners of the triangular shaped body 28. To connect bracket to engine 14, bracket 18 also includes a plurality of second apertures 46 configured for receipt of a fastener (not shown) that are formed at the corners of the triangular shaped body 28. First apertures 44 are located inboard from second apertures 46. In other words, first apertures 44 are located nearer to opening 29 in comparison to second apertures 46.

Because bracket 18 has first apertures 44 and second apertures 46, a first set of fasteners (not shown) is used to connect the bracket 18 to the high voltage component 16, and a second set of fasteners (not shown) is used to connect the bracket 18 to the engine 14. This configuration assists in transferring the load in the event of a vehicle impact that is of sufficient force to damage high voltage component 16 to the bracket 18, which enables bracket 18 to either detach from the engine 14 before damage to the high voltage component 16 occurs, or permit the component 16 to detach from the bracket 18. The size (i.e., diameter) of first apertures 44 may be equal to or greater than that of second apertures 46, which enables the same or a larger fastener (not shown) to be used to connect bracket 18 to high voltage component 18 in comparison to the fasteners (not shown) that are used to connect bracket 18 to engine 14. In addition, although not required, the amount of material of triangular body 28 that surrounds first apertures 44 may be greater in comparison to that of second apertures 46. The lesser amount of material that surrounds second apertures 46 permits the body 28 to fail at second apertures 46 in the event of a vehicle impact rather than first apertures 46, which further assists bracket 18 in detaching from engine 14 rather than component 16. In the event that first and second apertures 44 and 46 are the same, in the event of an impact of sufficient force, the component 16 can detach from the bracket 18 or the bracket 18 including the component 16 fixed thereto may detach from the engine 14 or other vehicle structure to which bracket 18 is attached.

By permitting bracket 18 and high voltage component 16 to detach from engine 14 or by permitting component 16 to detach from bracket 18 in the event of a vehicle impact, the odds of maintaining the integrity of the high voltage component 16 are enhanced. In addition, this assists in achieving battery (not shown) shutdown, which assists in maintaining high voltage isolation of the vehicle chassis from the high-voltage system during the impact event.

Figure 5:
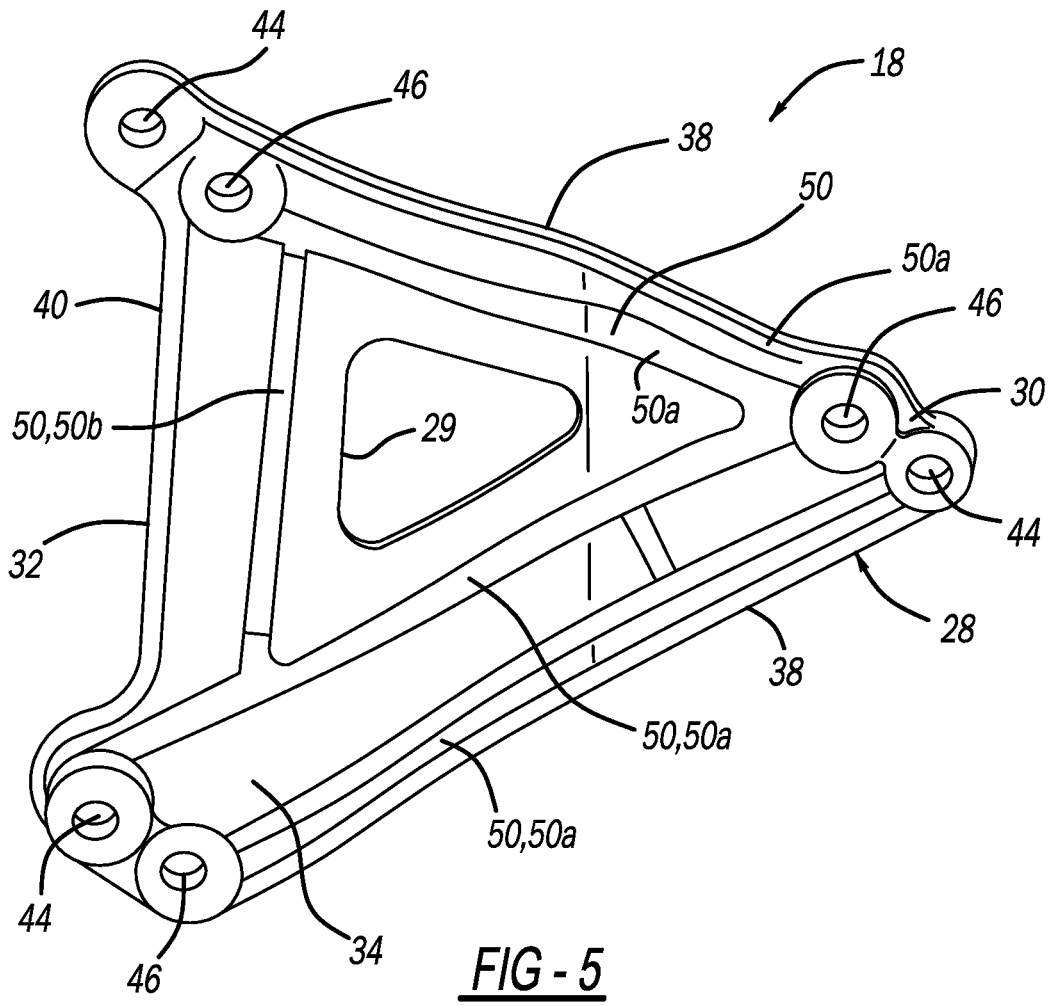
Figure 6:
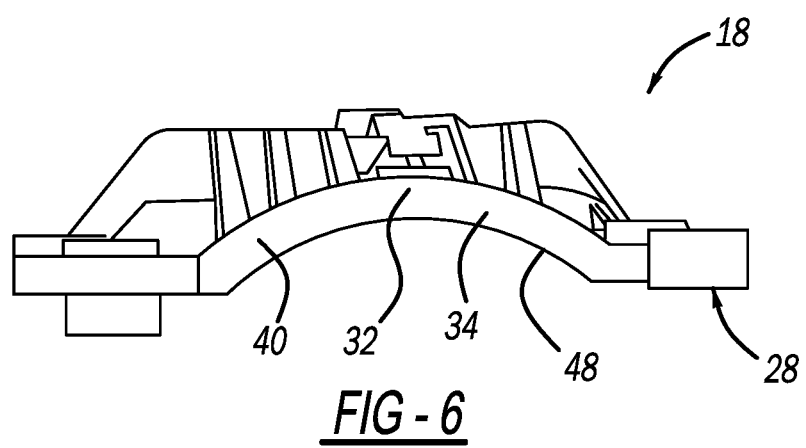

First surface 34 of bracket 18 includes a curved surface 48 (FIG. 6) that is shaped to correspond to that of cylindrical body 22 of housing 20 of high voltage component 16. As best shown in FIG. 5, first surface 34 additionally includes a plurality of elongated ribs 50 that extend along triangular body 28. Specifically, two pairs of first elongated ribs 50a extend along body 28 from first end 30 to second end 32 in parallel with the pair of side surfaces 38, and an elongated rib 50b extend along body 28 at second end 32 in parallel with side surface 40. The elongated ribs 50 increase the structural integrity of bracket 18.

Figure 3:
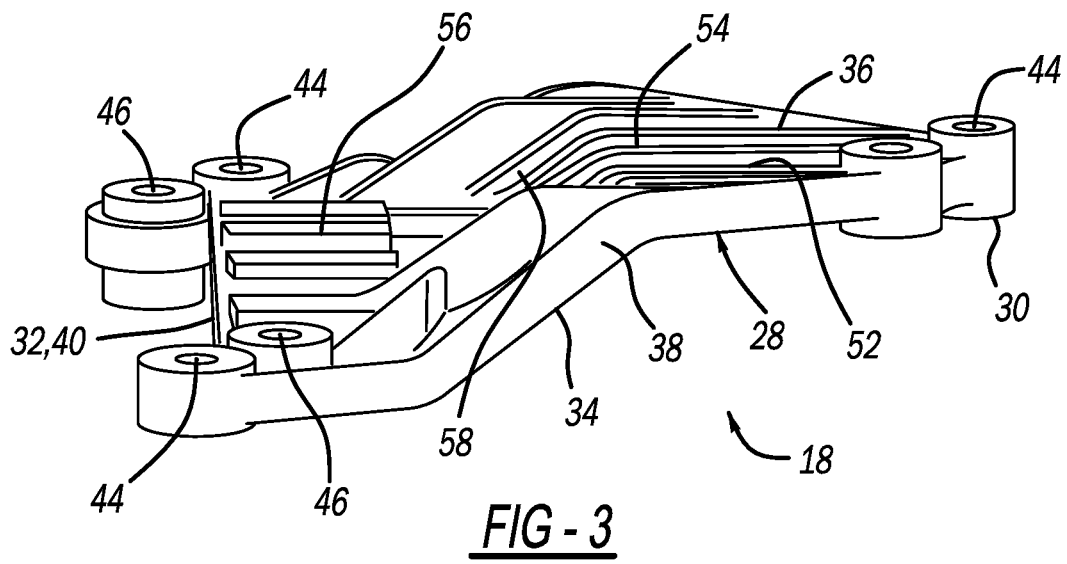
FIGS. 3 to 6 are various views of the breakaway adapter bracket according to the present disclosure.
Figure 4:
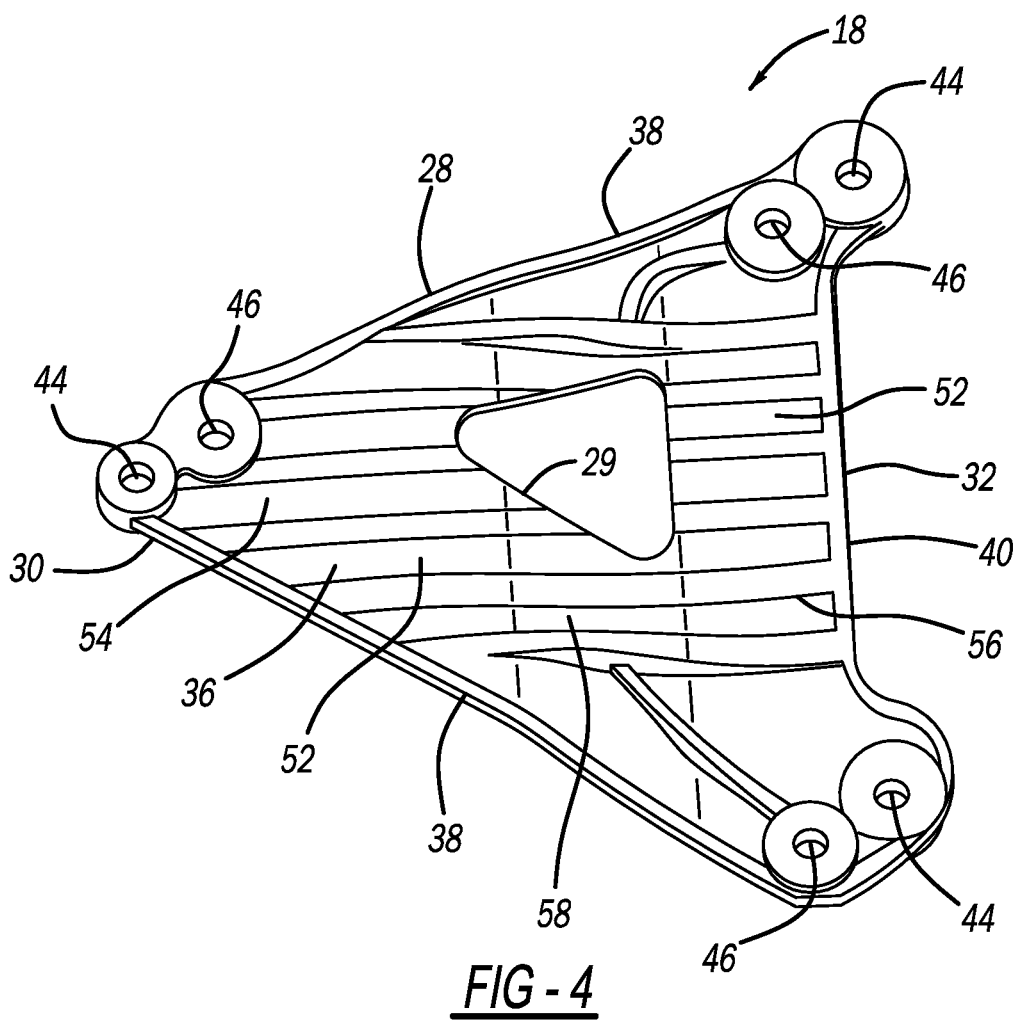

As best shown in FIGS. 3 and 4, second surface 36 of bracket 18 includes a plurality of third elongated ribs 52. Third elongated ribs 52 extend between first end 30 to second end 32 and orthogonal to second side surface 40 of second end 32. Similar to elongated ribs 50, third elongated ribs 52 increase the structural integrity of bracket 18. In addition, first ribs 50 may improve heat transfer from the high voltage component 18 to the bracket 18, and second ribs 52 may improve heat transfer from the bracket to the engine compartment 12 by acting as heat dissipating fins. In this regard, because component 16 is a high voltage component, heat may be generated within component 16 during use thereof. The use of ribs 50 and 52, therefore, may increase the useful life of high voltage component 16 by transferring the heat away from the component 16.

As best shown in FIG. 3, each of first and second surfaces 34 and 36 may be tiered. That is, first and second surfaces 34 and 36 includes a first tier 54 at first end 30 and a second tier 56 at second end 30. First tier 54 is connected to second tier 56 by an inclined section 58. The use of first tier 54, second tier 56, and inclined section 58 assists in locating bracket 18 at engine 14. The shape of bracket 18, however, is variable and can be modified to account for different packaging arrangements in engine compartment 12. That is, it should be understood that bracket 18 can be shaped to attach to different engines 14 or to different high voltage components 16 depending on the shape of engine 14 and high voltage component 16, as well as different packaging restraints that result from the location of the component 16 within engine compartment 12.

The material that forms bracket 18 is preferably a polymeric material that is resistant to the environment within engine compartment 12. That is, the material selected for bracket 18 should be resistant to water, oil, and dust. In addition, the polymeric material should be a generally rigid yet flexible material. The important aspect to keep in mind is that in the event of a vehicle impact that is of sufficient force to damage the component 16, the bracket 18 should be able to fail at second apertures 46 rather than first apertures 54. Example polymeric materials include polyamide (NYLON®) materials, polystyrene, polypropylene, and the like. Alternatively, bracket 18 may be formed of a metal material such as aluminum or an alloy material.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bracket configured to mount a high voltage component to a structure of a vehicle, comprising:
a body including a first major surface that faces the high voltage component and an opposing second major surface that faces the structure of the vehicle;
a plurality of first apertures formed in the body that are each respectively configured for receipt of a fastener that secures the body to the high voltage component; and
a plurality of second apertures formed in the body that are respectively configured for receipt of a fastener that secures the body to the structure of the vehicle;
wherein upon application of a sufficient force to the vehicle, a material of the body that forms at least one of the first apertures and the second apertures is configured to fail to permit either the body and the high voltage component to disengage from structure of the vehicle or the high voltage component to disengage from the body.

2. The bracket according to claim 1, wherein the body is triangular and includes a central opening, and each of the first and second apertures are formed at corners of the triangular body, the first apertures being located nearer to the central opening in comparison to the second apertures.

3. The bracket according to claim 2, wherein the triangular body includes a first end and an opposing second end, a pair of first side surfaces that connect the first end to the opposing second end, and a second side surface that extends along the second end,
the first major surface includes two pairs of first elongated ribs that extend along the triangular body from the first end to the second end in parallel with the pair of first side surfaces, and a second elongated rib that extends along the triangular body at the second end in parallel with second side surface.

4. The bracket according to claim 3, wherein the first and second elongated ribs increase the structural integrity of the triangular body.

5. The bracket according to claim 1, wherein the first major surface includes a contoured surface that corresponds to an outer surface of the high voltage component.

6. The bracket according to claim 3, wherein the second major surface includes a plurality of third elongated ribs that extend between first end to second end and orthogonal to a side surface that extends along the second end of the triangular body.

7. The bracket according to claim 1, wherein each of first and second major surfaces are tiered such that the first and second major surfaces each include a first tier at the first end and a second tier at the second end that are connected by an inclined section.

8. The bracket according to claim 1, wherein the body is formed of a polymeric material or a metal material.

9. The bracket according to claim 8, wherein the polymeric material includes a polyamide material.

10. The bracket according to claim 8, wherein the metal material includes aluminum.

11. A vehicle comprising:
a propulsion system;
a high voltage electric air conditioning compressor (EAC) including a housing coupled to the propulsion system; and
a bracket that detachably couples the housing of the EAC to the propulsion system;
the bracket including a body including a first major surface that faces the EAC and an opposing second major surface that faces the propulsion system;
a plurality of first apertures formed in the body that are each respectively configured for receipt of a fastener that secures the body to the housing of the EAC; and
a plurality of second apertures formed in the body that are respectively configured for receipt of a fastener that secures the body to the propulsion system;
wherein upon application of a sufficient force to the vehicle, a material of the body that forms at least one of the first apertures and the second apertures is configured to fail to permit either the body and the EAC to disengage from propulsion system of the vehicle or the EAC to disengage from the body.

12. The vehicle according to claim 11, wherein the body is triangular and includes a central opening, and each of the first and second apertures are formed at corners of the triangular body, the first apertures being located nearer to the central opening in comparison to the second apertures.

13. The vehicle according to claim 12, wherein the triangular body includes a first end and an opposing second end, a pair of first side surfaces that connect the first end to the opposing second end, and a second side surface that extends along the second end, the first major surface includes two pairs of first elongated ribs that extend along the triangular body from the first end to the second end in parallel with the pair of first side surfaces, and a pair of second elongated ribs extend along the triangular body at the second end in parallel with second side surface.

14. The vehicle according to claim 13, wherein the first and second elongated ribs increase the structural integrity of the triangular body.

15. The vehicle according to claim 11, wherein the first major surface includes a contoured surface that corresponds to an outer surface of the housing of the EAC.

16. The vehicle according to claim 13, wherein the second major surface includes a plurality of third elongated ribs that extend between first end to second end and orthogonal to a side surface that extends along the second end of the triangular body.

17. The vehicle according to claim 11, wherein each of first and second major surfaces are tiered such that the first and second major surfaces each include a first tier at the first end and a second tier at the second end that are connected by an inclined section.

18. The vehicle according to claim 11, wherein the body is formed of a polymeric material or a metal material.

19. The vehicle according to claim 18, wherein the polymeric material includes a polyamide material.

20. The vehicle according to claim 18, wherein the metal material includes aluminum.

* * * * *